July 22, 1952  H. A. STRICKLAND, JR., ET AL  2,604,577
HEATING AND WORK HANDLING APPARATUS
Filed Dec. 6, 1947  3 Sheets-Sheet 2

INVENTORS
Harold A. Strickland, Jr
Donald W. Riddell

Maurice A. Crews
ATTORNEY

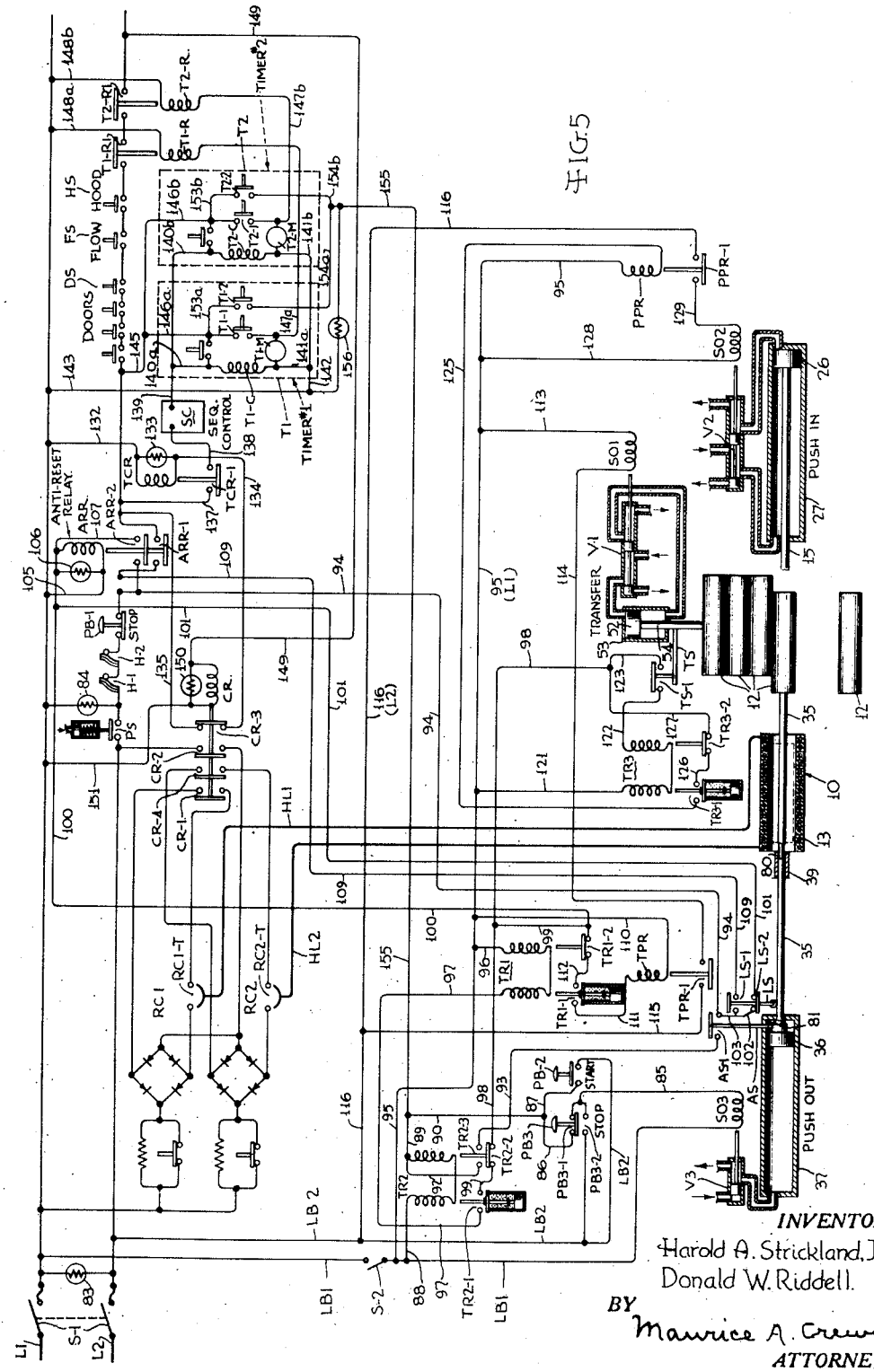

Patented July 22, 1952

2,604,577

UNITED STATES PATENT OFFICE 2,604,577

HEATING AND WORK HANDLING APPARATUS

Harold A. Strickland, Jr., Grosse Pointe Park, and Donald W. Riddell, Detroit, Mich., assignors, by mesne assignments, to The Ohio Crankshaft Company, Cleveland, Ohio, a corporation of Ohio Application December 6, 1947, Serial No. 790,154

3 Claims. (Cl. 219—47)

This invention relates to heating and work handling apparatus, particularly to induction heating apparatus and has for an object the provision of improvements in this art.

One of the particular objects of the invention is to provide apparatus which will feed a workpiece or billet into a furnace, time its heating period, eject it backward from the furnace, remove it and bring up a new workpiece for feeding, all in a controlled and automatic manner.

Another object is to provide a feeding device which will push a workpiece into the furnace and cause a heating cycle to be initiated but which withdraws before the workpiece becomes heated so as to avoid injury to the feeding device.

Another object is to provide a push-out or ejector device which can be operated either by a timer or manually and which, when operated, pushes out the workpiece to a position where it clears the front of the furnace but with the push-out element in a position to clear certain side transfer means in front of the furnace.

Another object is to provide that each part is fully operated and clear before the next succeeding part is operated.

The above and other objects and advantages of the invention will be apparent from the following description of an exemplary embodiment, reference being made to the accompanying drawings wherein:

Figure 5 is a wiring diagram with operating parts shown schematically.

Figure 1:
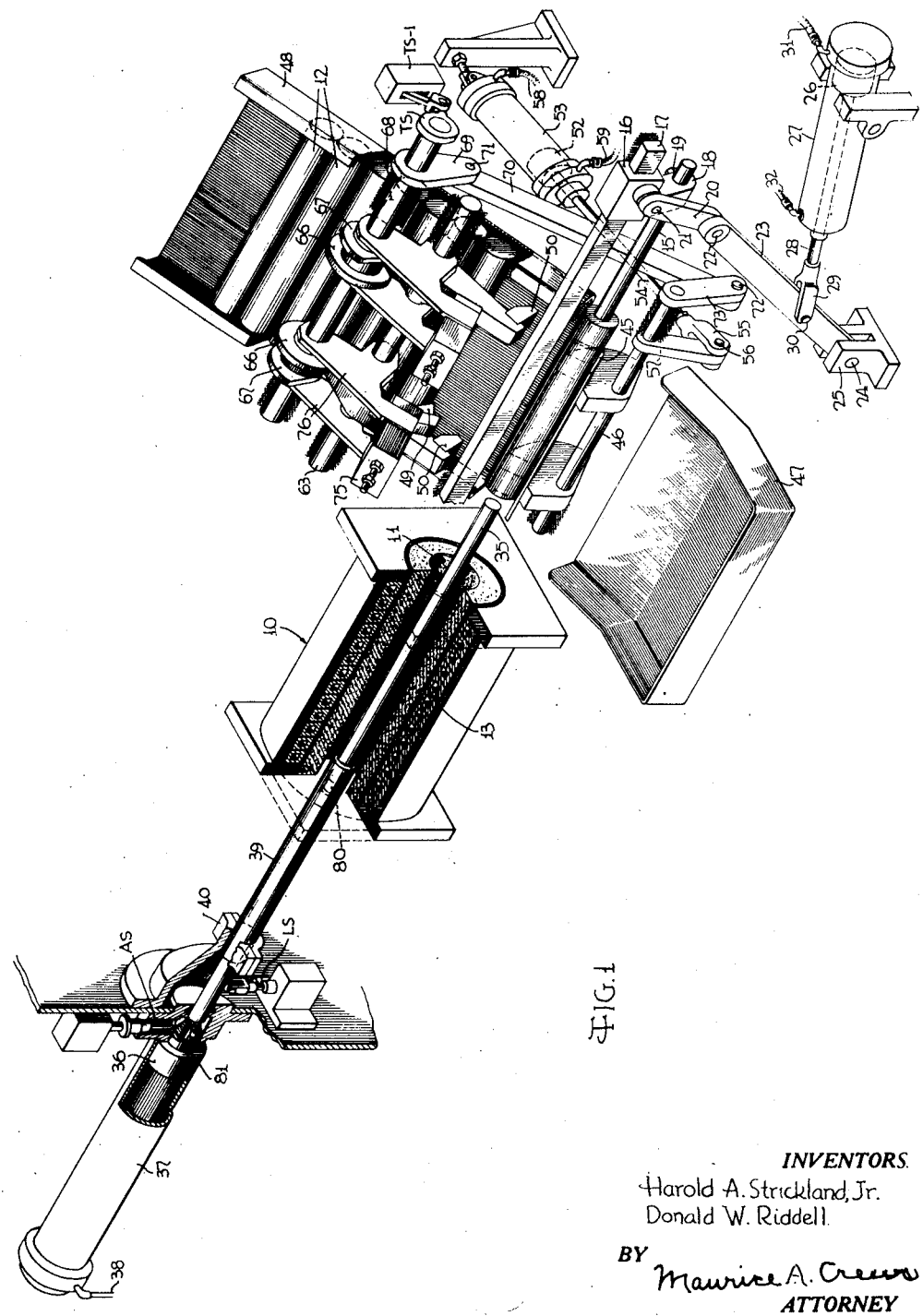
Figure 1 is a pictorial view, looking at a side and end, showing an embodiment in which an induction heating furnace heats billets or workpieces throughout their entire length.

Referring to the drawings, a heating furnace 10 is provided with an axially elongated heating chamber 11 to receive and heat a workpiece or billet 12. In the present embodiment, an induction heating furnace having a fluid-cooled heating coil 13 is used. This furnace may be of the type and may be mounted as shown in the patent to Strickland 2,408,350, granted September 24, 1946. The coil hood, closure panels or doors for the frame, pressure and cooling fluid supply means with pressure-assuring and heat-limiting means therefor of the patent may all be used herein, although for simplicity they are omitted from the apparatus views and shown only in the schematic view, Fig. 5.

Means are provided for pushing a workpiece into the furnace, the means here shown comprising a push-bar, ram or plunger 15 carried by a cross head 16 which is slidable on a guide bar 17. The push-bar 15 is adjustable in a projection 18 of the crosshead and is held in adjusted positions by a set screw 19. A link 20 is connected to the crosshead by a pin 21 and the link is connected by a pin 22 to a power arm 23 mounted by a pin 24 to a fixed support 25.

The arm 23 is actuated by reciprocating power means, here including a piston 26 (Fig. 5) operating in a cylinder 27 and having the piston rod 28 connected to the arm 23 by a fork 29 and a pin 30. The lever and linkage connection provides a quick feed and reduces floor space but, of course, if desired, a direct action piston pusher may be used, or any other suitable type of push-in mechanism. Pressure fluid is supplied to and exhausted from the head and rod ends of the cylinder by pipes 31 and 32 respectively.

In the present illustration, the workpiece wholly enters the furnace but the same type of mechanism is used for long workpieces where only an end enters the furnace.

Means are provided for pushing a workpiece rearwardly out of the furnace, the means here shown comprising a push-bar, ram of plunger 35, formed as a piston rod or extension thereof of a push-out piston 36 operating in a cylinder 37. Pressure fluid is supplied to the head end of the cylinder by a pipe 38. The piston rod or extension 35 operates in a tubular guide 39 adjustably mounted in a support 40 carried by the cylinder 37. The front end of the guide tube 39 forms a limit stop for workpieces pushed into the furnace. At its rear position, the push bar 35 would form a limit stop if the tube did not.

Means are provided for removing a heated workpiece when pushed out of the furnace and for bringing a new workpiece into feeding position, the means here shown comprising a V-shaped guide and support trough 45 turnably mounted on a rock shaft 46. The V-trough is power operated to swing down to transfer a hot workpiece to a delivery table 47 and to swing back to an upright position in alignment with the axis of the furnace coil to receive a new workpiece to be fed in and later to receive a heated workpiece which is ejected from the furnace.

New workpieces are fed down into the V-trough from a chute 48 which is long enough to hold a considerable number of workpieces. Escapement means in the form of dogs 49 and 50 are provided for feeding workpieces from the chute into the trough, the dogs 49 feeding to dogs 50 which hold a workpiece while the trough is turned to dumping position; and the dogs 50 feeding a single workpiece to the trough when it is returned to upright position while the dogs 49 hold back the stack of workpieces in the chute.

Power means are provided for operating the V-trough and the escapement dogs, the power means here shown comprising a transfer piston 52 operating in a cylinder 53 and having its piston rod 54 connected by a fork 55 and a pin 56 with an arm 57 secured on the shaft 46 of the trough. Pressure fluid is supplied to the head and rod ends of the cylinder 53 by pipes 58 and 59 respectively.

The dogs 49 and 50 are arranged in pairs, the dogs 49 being carried by rock levers 61 and the dogs 50 being carried by rock levers 62, both sets of rock levers being turnably mounted on a fixed shaft 63. At their upper ends the levers 61 and 62 are provided with cam rollers 64, 65 respectively which ride on operating cams 66 and 67 respectively which are secured on a cam rock shaft 68 turnably mounted in a suitable frame. Most of the frame is omitted for clarity, the anchorages therein only being shown by section lines.

The rock shaft 68 is provided with an arm 69 to which a connecting rod or link 70 is attached by a pin 71, the link at its other end being connected by a pin 72 to an arm 73 fixed on the trough shaft 46. The dog rocking levers 61 and 62 are pressed downward at the dog ends by springs 74 carried by mountings 75 carried on pairs of support plates 76. The plates are conveniently supported on the shafts 63 and 68 and form side retaining means for the dog levers and their operating cams.

Figure 2:
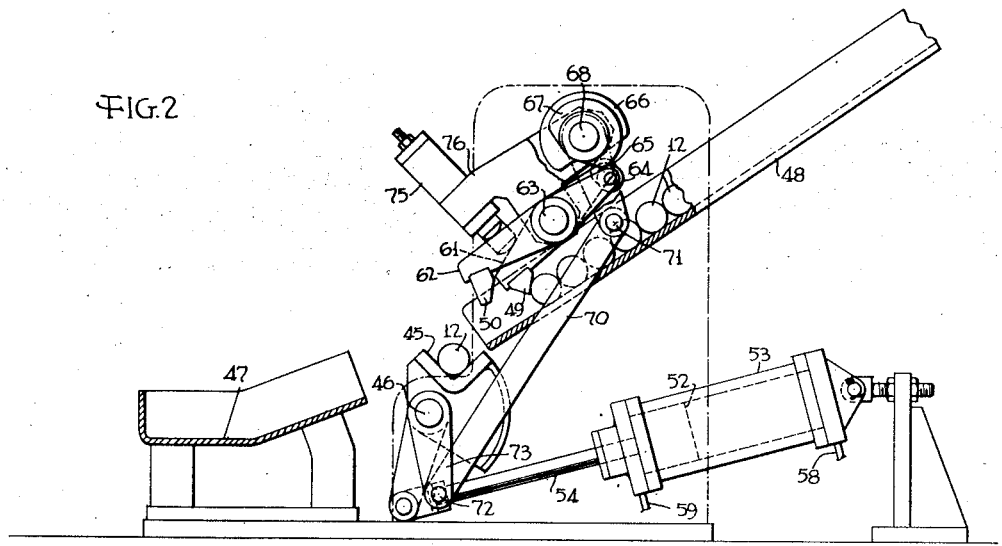
Figure 2 is an end elevation of transfer mechanism and related apparatus.
Figure 3:
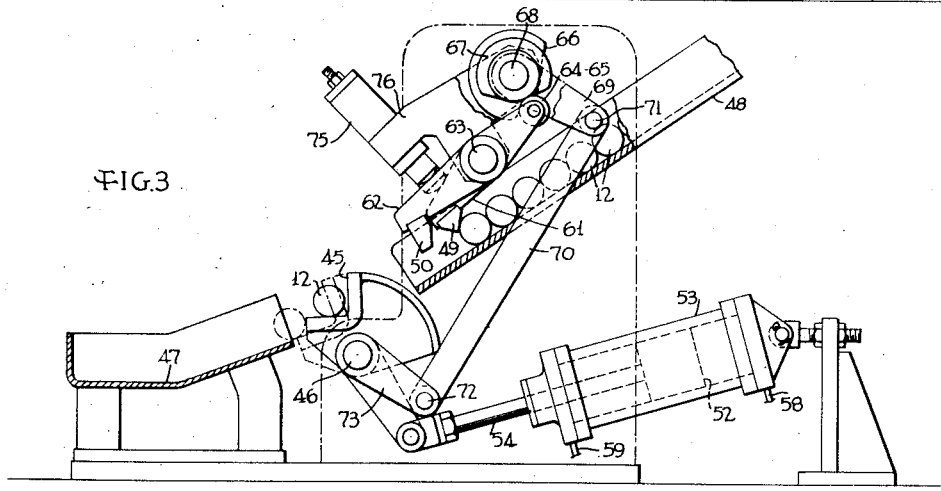
Figure 3 is a view of the parts shown in Fig. 2 but in a different position.
Figure 4:
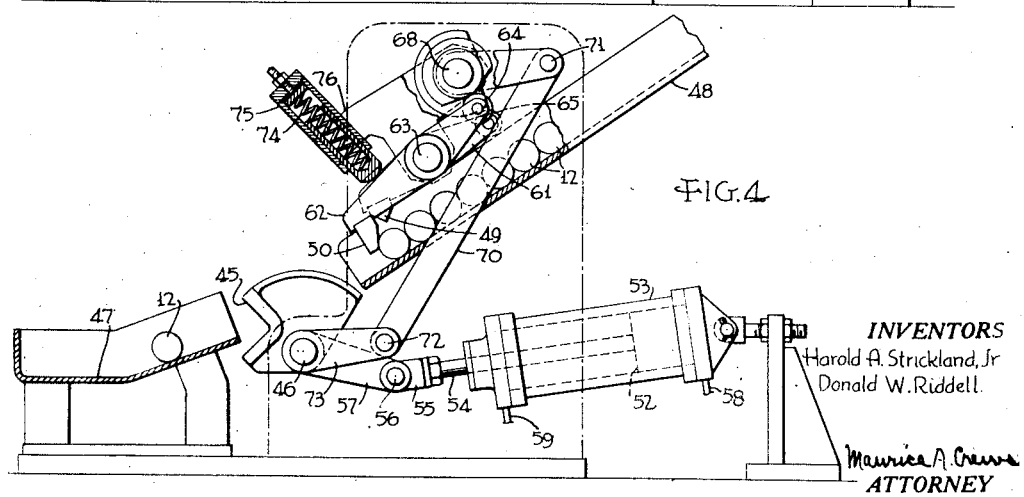
Figure 4 is a view similar to Figs. 2 and 3 but with the parts shown in another position.

The operation of the apparatus may now be explained by reference to the mechanisms which have been shown in Figs. 1 to 4 and described hereinabove and by particular reference to the schematic mechanism and wiring diagram, Fig. 5.

As a reference point, it will be assumed that the push-out piston 36 is in its forward position (where it remains unless pushed back by the push-in piston), that the push-in piston 26 is in its rearward position, having moved back shortly after it pushed in the last previous workpiece, and that the transfer piston 52 is in its rear position (in this case, because of the lever system, it is actually at the rod end of its cylinder). Also, it is to be noted that there is a device which may be designated as a load switch operator LS, associated with the push-out bar or ram 35, which is actuated by a cam surface 80 on the bar when the bar is in its rearmost position. In the forward position of the push-out bar a load switch LS–2 stands closed and a load switch LS–1 stands open, but when the bar reaches its rearmost position switch LS–1 is closed and LS–2 opened to change again as soon as the bar starts forward. Another associated device, which may be designated as an air cylinder switch AS–1 of a cam operated device AS, stands closed except when the push-out bar is in its most forward position, being there opened by a cam 81 on the push bar.

The transfer piston 52 has associated with it a switch TS–1 which stands closed when the transfer piston is in its retracted position (here at the rod end, as stated) but which opens as soon as the piston starts forward and closes again as the piston reaches the end of its return stroke. The operating device is actually an oscillating cam TS but for purposes of illustration, a lateral projection is shown in Fig. 5 and designated by the same character as the cam. Also, in Fig. 5 the transfer mechanism is treated as comprising a flat table across which workpieces are pushed by a piston which has a stroke of a length just equal to the width of a workpiece, the heated workpiece after return being pushed away down an incline and a new workpiece placed on the table near the transfer piston.

To prepare for the start of operations, a main switch S–1 is closed in the main current supply lines L1, L2. This lights a lamp 83.

Water is supplied to the induction heating coil and when this reaches the proper pressure, a pressure switch PS in L2 is closed. A lamp 84 indicates closure of the pressure switch. Thermostat switches H–1, H–2 in L2 open only if the coil or cooling water therefor become too hot, so they will be considered to be closed under all normal conditions. An emergency stop push button PB–1 in L2, when pressed, will halt all operations but it normally stands closed, as shown.

To start operations, the operator presses start push button PB–2. This energizes a solenoid SO3 which actuates a valve V3 of the push-out cylinder 37, but as the piston is already in forward position, no action occurs here. Closure of start push button PB–2 also energizes a relay which has a time delay action in part and is designated as auto start push-out TR2.

The paths established by closure of PB–2 are as follows. For SO3, from L1 current flows through LB1 through a "safe run" switch S–2, which is normally closed, to SO3, thence by conductor 85 to a stop push button switch PB3, through its normally closed contacts PB3–1 and conductors 86, 87 to PB–2 (start), through its contacts (momentarily closed) and a conductor LB2 to L2.

For TR2, from LB1 current flows through conductor 88 to the coil of TR2 (here represented as two coils for simplicity, one for a time delay drop-off switch TR2–1 and the other for a quick action operator for switches TR2–2 and TR2–3), thence through conductors 89, 90 and 87 to PB–2 and from this through LB2 to L2.

Time relay TR2, when energized, opens the normally closed switch TR2–2 and closes switch TR2–3. It also closes time delay switch TR2–1. The schematic illustration indicates that the time delay is caused by a dash-pot action, the switch blade remaining in a closed or open position until moved by lugs on its dash-pot operated rod.

Closure of TR2–3 has no immediate effect because at this time air cylinder switch AS–1, which is in series with it, is open. (Circuit, LB1, coil TR2, conductor 92, TR2–3, 93, AS–1 and conductor 94 to L2 beyond PB–1.)

Closure of time delay switch TR2–1 will have no immediate effect because quick-close switch TR2–2 is in circuit with it and this is open and remains open as long as PB–2 is closed. However, as soon as PB–2 is opened, it deenergizes TR2 and TR2–2 closes at once. Since TR2–1 remains closed for a delay action period, another delay action transfer timer relay TR1 is energized. (Circuit, LB1, conductor 95, conductor 96, coil TR1, conductor 97, TR2–1, TR2–2, conductor 98, conductor 99, conductor 100, conductor 101, load switch LS–2 (now closed because push-out piston 36 is forward), 102, 103, 94, to L2 beyond PB-1.)

It may here be noted that a safety relay is put in circuit beyond the pressure switch PS, overheat switches H-1, H-2 and emergency stop push button PB-1. This may be designated as an "anti-reset relay" ARR. If the push-out piston is forward, ARR is energized as soon as current is established through PB-1. (Circuit, L1, conductor 105, coil of ARR (pilot lamp 106 in parallel), 101, LS-2, 102, 103, 94 to L2 beyond PB-1.) When ARR is energized, it closes its lock switch ARR-2. (Circuit, L1, 105, coil of ARR, conductor 107, ARR-2 to L2.) It also closes its switch ARR-1, which is in series with load switch LS-1, to close a gap in L2 before heat can be supplied to the heating coil. (Circuit, L2, 94, 103, LS-1, conductor 109, ARR-1, L2.)

When TR1 is energized, it closes its delay switch TR1-1 and opens its quick-action switch TR1-2. As soon as TR2-1 opens, it deenergizes TR1 and its switch TR1-2 will close at once but TR1-1 will remain closed for a time. This causes a relay, which may be designated as a transfer pilot relay, TPR, to be energized to close its switch TPR-1. (Circuit, LB1, 95, conductor 110, TPR, conductor 111, TR1-1, conductor 112, TR1-2, 100, 191, LS-2, 102, 103, 94 to L2 beyond PB-1.)

Closure of the switch TPR-1 of TPR energizes the solenoid SO1 of a valve V1 of the transfer cylinder 53. (Circuit, LB1, 95, conductor 113, coil of SO1, conductor 114, TPR-1, conductor 115, conductor 116 to LB2.)

Transfer piston 52 moves out to remove a hot workpiece (if present) and raise feed-down dog 49 to allow the stack of workpieces in the chute to move down against the holding dog 50. In Fig. 5, as stated, the escapement action is omitted and the action dealt with as if the piston 52 pushed the line of workpieces across a table until the hot one dropped off and another was brought into feeding position. As soon as the piston 52 starts to move out, it operates its switch actuator TS, and causes its switch TS-1 to be closed. This energizes a third delay-action relay TR3 associated with the push-in piston. (Circuit, LB1, 95, conductor 121, coil of TR3, conductor 122, switch TS-1, conductor 123, 98, 99, 100, 101, LS-2, 102, 103, 94 to L2 beyond PB-1.)

When TR3 is energized, it closes its delay-action switch TR3-1 and opens its quick-action switch TR3-2. There is no immediate effect from this switch actuation.

Shortly, however, time delay switch TR1-1 opens, which deenergizes SO1 and transfer piston 52 moves back. In this movement, it turns the V-trough to an upright position and causes the upper dogs 49 to be lowered to hold the line of workpieces above the lowermost one and also causes the lower dogs 50 to release a workpiece to drop into the V-trough.

As the transfer piston 52 completes its return stroke, it opens its switch TS-1, which causes TR3 to be deenergized. Its switch TR3-2 closes at once but its time delay switch TR3-1 remains closed for a while. This causes a push-in pilot relay PPR to be energized. (Circuit, LB-1, 95, coil PPR, conductor 125, TR3-1, conductor 126, TR3-2, conductor 127, 98, 99, 100, 101, LS-2, 102, 103, 94 to L2 beyond PB-1.)

Energization of PPR causes its normally open switch PPR-1 to be closed. Closure of PPR-1 energizes solenoid SO2 to actuate the valve V2 of the push-in cylinder 27. (Circuit, LB1, 95, conductor 128, coil SO2, conductor 129, PPR-1, 116 to LB2.)

*Push-in piston 26 moves forward.*—A workpiece which is in trough 45 is pushed into the furnace until its end comes against the front end of the adjustable tubular guide 39.

*The push-out piston 36 is pushed back.*—At the start of its rearward movement, piston 36, through cam 81, causes switch AS-1 to be closed and at the completion of its rearward stroke, through cam 80, causes switch LS-1 to be closed and LS-2 to be opened.

After its time delay period, switch TR3-1 drops to deenergize PPR and SO2 and allow valve V2 to change its position.

*Push-in piston 26 returns.*—This has no effect on any of the interlocking means but gets the push bar back out of the furnace so it will not be heated. It does not necessarily have to return before the heating period begins.

Closure of air cylinder switch AS-1 connects TR2-3 but as this stands open, no action occurs. The circuit is put under the control of TR2-3 and associated elements.

Operation of load switch LS-2 normally has no effect because it is in parallel with the lock switch ARR-2 of anti-reset relay ARR, which remains energized until some abnormal event occurs.

Closure of load switch LS-1 begins a sequence of actions which ends with the application of heat and the initiation of a timing period. It is in series with switch ARR-1 to close a gap in L2 but since ARR normally maintains ARR-1 closed, the control of this phase of action is left to LS-1 alone. Closure of LS-1 causes a timer control pilot relay TCR to be energized. (Circuit, L1, conductor 132, coil TCR, (lamp 133 in parallel), conductor 134, normally closed switch CR-3 of a main contactor relay CR, conductor 135 to L2.) Energization of relay TCR and closure of its switch TCR-1 places a sequence controller SC and timing devices T1, T2 (in parallel) in connection with L2. The sequence controller is timed to the action of some forging machine which the present apparatus serves. It might as well time the operation of the present apparatus with that of a similar heating apparatus. It need not be described. (Circuit, L2, conductor 137, TCR-1, conductor 138, SC, conductor 139, conductor 140a, 140b, clutch coils T1-C, T2-C of T1, T2, conductors 141a, 141b, conductor 142, conductor 143 to L1.)

Closure of ARR-1 also puts current on the motors T1-M, T2-M of the timers, switches T1-1, T2-1 being at this time closed. (Circuit, T2, conductor 145, conductors 146a, 146b, switches T1-1, T2-1, motors T1-M, T2-M, 141a, 141b, 142, 143 to L1.)

Closure of ARR-1 also energizes timer relays T1-R, T2-R to close switches T1-R1, T2-R1 in L2. (Circuits, L2 145, 146a, 146b, switches T1-1, T2-1, conductors 147a, 147b, coils T1-R, T2-R, conductors 148a, 148b to L1.) It is to be understood that the furnace casing door switches DS are closed, that the cooling fluid flow switch FS is closed, and the heating coil hood switch HS is closed to complete L2 to T1-R1 and T2-R1.

Closure of switches T1-R1 and T2-R1 energizes the main contactor relay CR. (Circuit, L2, conductor 149, coil of CR (lamp 150 in parallel), conductor 151 to L1.)

Energization of contactor relay CR closes its switches CR-1, CR-4, CR-2 and opens its switch CR-3, previously mentioned.

Closure of switches CR-1, CR-4 and CR-2 energizes the rectifier circuits generally indicated at RC1, RC2 to energize main contactor coil terminals RC1-T, RC2-T to supply high frequency heating current from another supply circuit to line conductors HL1, HL2 to heating coil 13.

Heating period begins

Opening of switch CR-3 deenergizes TCR and opens TCR-1 which, in turn, deenergizes timer clutch coils T1-C, T2-C to engage the clutches with the motor shafts to start the timing action contemporaneously with the start of the heating action.

It may here be noted that the timers T1, T2 are of the type having a fixed contact hand settable for a given period, a movable contact hand which is spring-returned to zero when the clutch is released and which is driven around to the fixed hand when the clutch is reengaged. A synchronous drive motor is employed for the clutch shaft of the movable hand.

The use of two timers is for the purpose of assuring that at least one will operate properly, for greater safety.

At the completion of a timing period, or when the timer first to complete its action closes its circuit, the auto start relay TR2 is energized. (Circuit, L2, 145, 146a, 146b, conductors 153a, 153b, timer finish switches T1-2, T2-2, conductors 154a, 154b, conductor 155, 89, coil of TR2, 88 to LB1.) A lamp 156 is in parallel to show completion of the timing cycle and heating period.

Energization of TR2 closes TR2-1, opens TR2-2 and closes TR2-3. TR2-3 is in series with air cylinder switch AS-1, which remains closed until the piston 36 reaches the forward end of its stroke. SO3 is thereby energized. (Circuit, LB1, 88, coil TR2, 92, TR2-3, 93, AS-1, 94 to L2.) This has the same effect as if start push button PB-2 had been pushed.

*Push-out piston 36 moves forward.*—This action, through its push bar 35, pushes a heated billet from the furnace and upon the V-trough. The bar 35 does not advance far enough to foul the turning action of the trough.

At the start of its forward movement, the push-out piston opens load switch LS-1 in L2 to stop the timers, by deenergizing TCR, and to cut current from the heating coil by deenergizing CR. (Heating period ends). The push-out piston movement also closes its load switch LS-2 but, as seen, the operation of this switch has no effect as long as anti-reset relay ARR is locked in through ARR-2. At the extreme forward end of its movement, piston 36 opens air cylinder switch AS-1 to deenergize TR2 and SO3.

From here on the cycle of operations previously described is repeated, that is, the automatic actions which were initiated by the deenergization of TR2, as previously described to be caused by release of the push button PB-2, are started, the transfer piston being operated back and forth to transfer the hot workpiece and feed in a new one, the push-in piston moving the workpiece into the furnace and pushing the push-out piston back, and so forth.

If the "stop" push button PB3 is pushed down, it opens PB3-1 and closes PB3-2 which causes the push-out piston to at once eject a workpiece from the furnace.

If the "top" push button PB-1 in L2 is pushed down, the anti-reset relay ARR is deenergized and all operations are stopped.

From the above description and a careful consideration of the wiring diagram, it will be noted that whenever the apparatus stops for any reason, the push-out piston moves forward to push a workpiece out of the furnace; and also that when the apparatus again starts into operation, the first action is to transfer a workpiece from the V-trough (if one be present) and to feed down a new workpiece. Even if a cold workpiece is in the trough at the start, it will be transferred and a new workpiece fed in. This insures against reheating and thus overheating a partially heated workpiece. It also insures that the V-trough will always be clear for the reception of a workpiece pushed back out of the furnace.

It will thus be seen that the invention provides a very simple, convenient and efficient machine for heating and handling workpieces; that the workpieces are fed to the front of and into the machine in a rapid and orderly manner; that the heating period is accurately timed; that the workpieces are pushed out of the furnace at the completion of a heating period, or in emergency at any stage of heating; and that the workpieces are removed laterally away from the front of the furnace after they have been returned therefrom.

While one embodiment of the invention has been described for purposes of illustration, it is to be understood that there may be various embodiments within the limits of the prior art and the scope of the subjoined claims.

What is claimed is:

1. In combination with an elongated tubular furnace chamber having a workpiece-receiving opening only slightly greater in dimension than the diameter of the workpiece to be heated, transfer means for removing a workpiece from the front of the furnace chamber and for bringing another workpiece into position in front of the furnace chamber, a push-in device for pushing a workpiece into the furnace, a device for timing the duration of the heating period of the furnace while a workpiece is in the furnace chamber, a push-out device for ejecting a heated workpiece from the chamber, power means for operating said push-out device in an ejecting direction, said push-in device pushing said push-out device back through a workpiece and said push-out device limiting the inward position of the workpiece, means actuated when the push-out device is in its rear position for starting said timing device into action, and means controlled by said timing device to halt the heating of a workpiece and to cause said push-out device to operate in an ejecting direction.

2. In combination with an elongated tubular induction coil heating furnace, a first pusher at one end of said furnace for feeding a workpiece into the furnace, a timer set into action by the feeding in of a workpiece for causing heating current to be supplied to the induction heating coil, a second pusher at the opposite end of said furnace set into action by the completion of a timed period by said timer for pushing a heated workpiece from the furnace, the timer also cutting off current to the furnace, transfer means set into action by completion of the action of pushing out a workpiece for removing a heated workpiece from the front of the furnace and placing another workpiece in feeding position in front of the furnace, and means actuated by said transfer means for causing said first pusher to operate after the transfer means has completed its movements.

3. In combination with an axially elongated heating chamber, guide means for directing a workpiece into the furnace along the axis, means for feeding a workpiece from said guide into the furnace and back on said guide means in front of the furnace, and transfer means for removing a returned workpiece laterally from said guide means and supplying a new workpiece thereto, said guide means including a V-shaped trough and means for tilting said trough to remove a returned workpiece and bringing it back to upright position to receive a new workpiece.

HAROLD A. STRICKLAND, Jr.
DONALD W. RIDDELL.

REFERENCES CITED

The following references are of record in the file of this patent:

UNITED STATES PATENTS

| Number | Name | Date |
|---|---|---|
| 267,633 | Wolfe | Nov. 14, 1882 |
| 634,499 | Hundley | Oct. 10, 1899 |
| 1,748,465 | Summey | Feb. 25, 1930 |
| 1,936,840 | Inscho | Nov. 28, 1933 |
| 2,325,638 | Strickland | Aug. 3, 1943 |
| 2,421,920 | Barkstrom et al. | June 10, 1947 |
| 2,440,316 | Unterweiser | Apr. 27, 1948 |
| 2,465,306 | Durand | Mar. 22, 1949 |
| 2,504,198 | Jagen | Apr. 18, 1950 |
| 2,506,425 | Journeaux | May 2, 1950 |

FOREIGN PATENTS

| Number | Country | Date |
|---|---|---|
| 264,110 | Great Britain | Jan. 13, 1927 |